Nov. 24, 1931. L. V. CRAM 1,833,414

CLUTCH FRICTION FACING

Filed March 19, 1930

Inventor
Leroy V. Cram

By Blackmore, Spencer & Hulk
Attorneys

Patented Nov. 24, 1931

1,833,414

UNITED STATES PATENT OFFICE

LEROY V. CRAM, OF DETROIT, MICHIGAN, ASSIGNOR TO GENERAL MOTORS CORPORATION, OF DETROIT, MICHIGAN, A CORPORATION OF DELAWARE

CLUTCH FRICTION FACING

Application filed March 19, 1930. Serial No. 436,999.

This invention relates to clutches used on automotive vehicles and is particularly concerned with a novel type of clutch ring.

In the past, moulded clutch rings have been made with flat sides and have been secured to the clutch plate by means of rivets. The heads of the rivets have been countersunk in the ring to permit proper frictional contact by the clutch plates and after a period of time, the ring wore down to the level of the rivet heads when it was necessary to replace it to secure proper action of the clutch. This left about one half of the clutch ring which could not be used and which resulted in a direct waste of half of the moulded ring material. In an effort to reduce the cost of the clutch ring, consideration was given to decreasing the diameter or the thickness of the ring but it was found that if the diameter be decreased, the acting surface of the clutch was decreased and interfered with its efficient operation. There was no advantage gained by decreasing the thickness for the reason that the rivets demanded a certain thickness of clutch facing in order to hold the facing to the plate. If a thinner facing was therefore used it would only result in the facing wearing out all the faster with no saving in material.

In considering ways of reducing the spinning weight of the clutch as well as decreasing the cost and eliminating the waste when the facing was worn down to the level of the rivet heads, the thought occurred that if the face of the ring adjacent the clutch plate could be recessed or hollowed out or provided with a number of inwardly extending projections, that the same clutch action would be secured by the same thickness of moulded ring but with a lesser amount of material and a corresponding decrease in weight and cost. In forming the recesses or depressions in the clutch ring, it was found expedient to place them at intervals between the rivets for the reason that recesses could not be applied at the rivets because the material was weakened too much. If each recessed or indented portion were comprised of a single recess or depression, there would be a tendency for the clutch facing to spring or to move away from its adjacent friction surface. It was, therefore, found more desirable to form each recessed portion of a plurality of smaller spaced recesses leaving a plurality of ribs abutting directly against the clutch facing.

Figure 1:
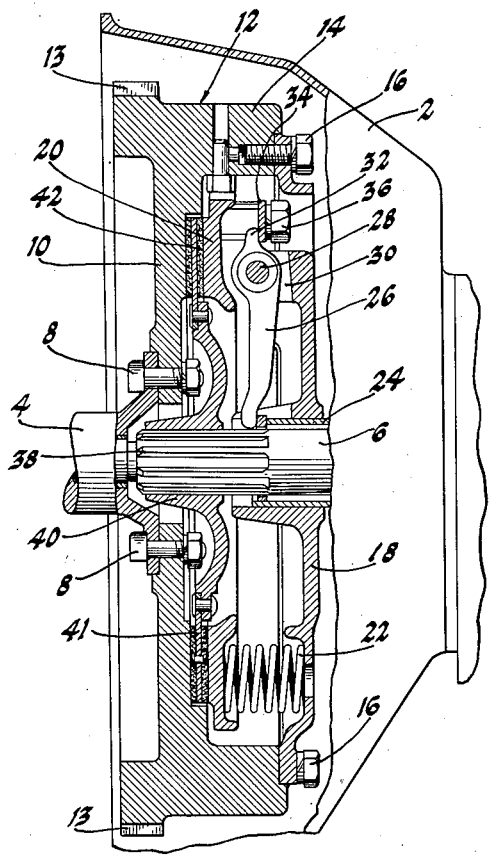
Figure 1 is a sectional view of a clutch shown in its housing.

Referring to the drawings, the numeral 2 indicates a clutch housing of any suitable type. The drive shaft is indicated at 4 and the driven shaft at 6. Secured to the drive shaft 4 by means of bolts and nuts 8, is one member 10 of the clutch 12. The member 10 is also the flywheel having the starting gear 13 and is dished or has the annular rib 14 to which there is secured by means of the machine bolts 16, the rear cover or closure 18. Mounted in the dished portion of the clutch member 10 is the second clutch member or ring 20 pressed away from the closure plate 18 by means of the coil springs 22, only one of which is shown. A slidable sleeve is shown at 24 which is adapted to be moved and strike against the ends of the levers 26 pivoted at 28 between pairs of ears 30 which extend inwardly of the plate 18. Only one lever 26 is shown but as many as are desired may be used. The opposite ends 32 of levers 26 extend under plates 34 secured to the second member 20 of the clutch by means of the machine bolts 36. As the member 24 is moved inwardly, it will swing the levers 26 on their pivots to cause the clutch member 20 to move away from the clutch member 10. The parts so far described are conventional and per se form no part of the invention.

The end of the driven shaft 6 is splined as at 38 and slidably receives the clutch plate 40 which includes a ring 41 riveted thereto. Secured to the outer faces of the clutch plate are the moulded clutch facings 42. The facings 42 are in washer form and are secured to the side faces of the plate 40 by means of rivets passing through countersunk openings 44 in the clutch facing and through corresponding openings in the clutch plate. The heads of the rivets are set well down into the openings and leave about half of the thickness of the clutch facing extending beyond the rivet heads.

In order to make a lighter clutch facing to reduce the spinning weight and also to reduce the cost of the moulded clutch ring, there has been provided on the side of the clutch facing adjacent the clutch plate, a plurality of spaced recessed portions 46 which are separated by non-recessed portions 48 in which non-recessed portions 48 the rivets are received.

Figure 3:
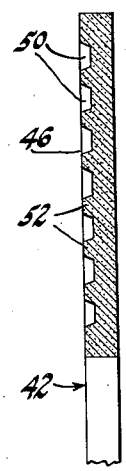
Figure 3 is a section on the line 3—3 of Figure 2.
Figure 2:
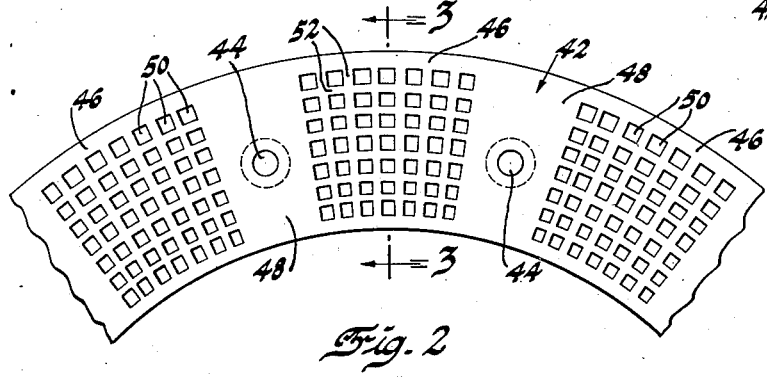
Figure 2 is an enlarged fragmentary face view of a portion of a novel clutch ring.

By referring to Figures 2 and 3, it will be noted that each recessed portion 46 comprises a plurality of smaller recesses 50 leaving a plurality of ribs 52 extending transversely and longitudinally of the clutch ring. The reason for the plurality of smaller recesses or indentations 50 instead of one large recess is to prevent a sagging or springing movement in the clutch facing when the clutch is applied. If but one large recess were made, the middle portion of the recessed portion would tend to push inwardly toward the plate when the clutch is applied and decrease the efficiency of the clutch. The plurality of supporting ribs 52 between the smaller recesses 50 will effectively prevent any spring or sag in the clutch facing.

I claim:

1. In a clutch, a clutch plate, a moulded clutch ring secured to said plate, said ring having a plurality of recesses on its face adjacent the plate.

2. In a clutch, a clutch plate, a moulded clutch ring secured to said plate by means of rivets passing through said plate and ring, said ring having between said rivets a plurality of sections each comprising a plurality of recesses.

3. In a clutch, a clutch plate, a moulded clutch ring secured to said plate by means of rivets passing through said plate and ring, said ring having between said rivets and on its face adjacent the plate a plurality of sections each comprising a plurality of recesses.

4. In a clutch, a clutch plate, a moulded clutch ring secured to said plate, said ring having spaced recessed portions, each of said recessed portions comprising a plurality of smaller recesses.

5. In a clutch, a clutch plate, a moulded clutch ring secured to said plate by means of rivets, said ring having a plurality of recessed portions between said rivets and on its face adjacent the plate, said portions comprising a plurality of smaller recesses.

6. An article of manufacture, comprising a moulded clutch ring having a plurality of recessed portions, each portion comprising a plurality of smaller recesses.

7. An article of manufacture, comprising a moulded clutch ring having a plurality of spaced recessed portions separated by non-recessed portions, each recessed portion comprising a plurality of smaller recesses.

8. An article of manufacture, comprising a moulded clutch ring having a plurality of recessed portions on one of its faces, each portion comprising a plurality of smaller recesses.

9. An article of manufacture, comprising a clutch ring having thereon a plurality of sections differently formed from the remainder of the ring, each section comprising a plurality of recessed portions.

In testimony whereof I affix my signature.

LEROY V. CRAM.